Nov. 17, 1964  E. A. GILBERT  3,157,841
VARIABLE FREQUENCY OSCILLATOR AMPLITUDE STABILIZED
BRIDGE AND SELF-DERIVED REFERENCE VOLTAGE
Filed Jan. 5, 1961
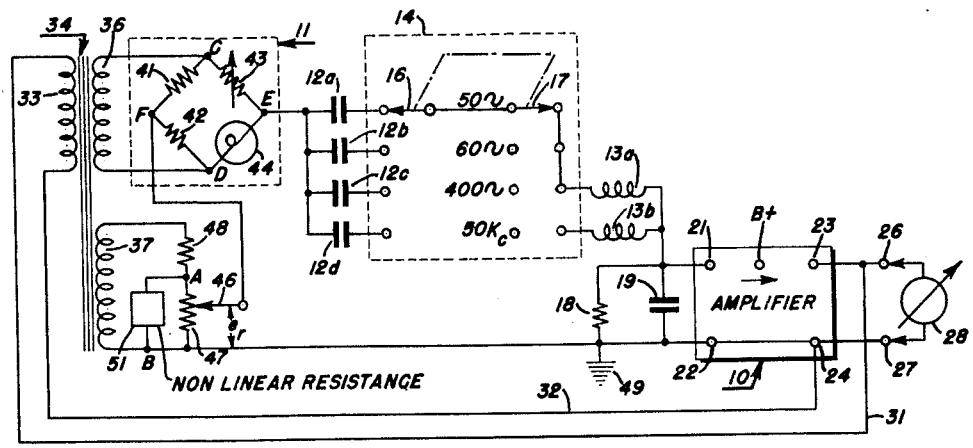
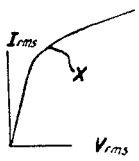
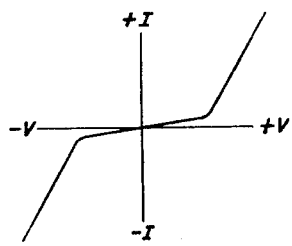
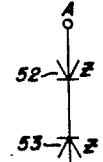
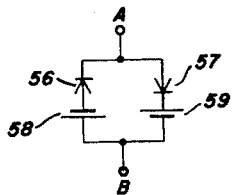
EVERETT A. GILBERT
INVENTOR.
BY
*Rudolph J. Jusick*
ATTORNEY

United States Patent Office 3,157,841
Patented Nov. 17, 1964

3,157,841
VARIABLE FREQUENCY OSCILLATOR AMPLITUDE STABILIZED BRIDGE AND SELF-DERIVED REFERENCE VOLTAGE
Everett A. Gilbert, Denville, N.J., assignor to Radio Frequency Laboratories, Inc., Boonton, N.J., a corporation of New Jersey
Filed Jan. 5, 1961, Ser. No. 80,807
3 Claims. (Cl. 331—110)

This invention relates to a precision power supply and more particularly to a variable frequency power supply having a stable output suitable for the calibration of instruments, or any other use.

In the following description, the precision power supply of my invention is described in terms of an A.-C. calibrating apparatus for the calibration of electrical instruments. It will be expressly understood, however, that such power supply may be employed in any arrangement where a precision output is required, and is not limited to instrument calibration use. That is, in addition to its function in an instrument calibrator, the apparatus may be used as a highly regulated source in any desired application where such source is required.

Regulated power supplies of the general type to which my invention is directed are well known and incorporate a regulating bridge which may comprise a plurality of resistance elements connected together in series circuit. At least one bridge arm includes a resistance element which changes resistance in accordance with the amount of current therethrough, such resistance element comprising, for example, an electric lamp, thermistor, ballast tube, or the like. The bridge is included in a feedback circuit for an amplifier, which feedback circuit includes also a filter network comprising a tuned resonant circuit. The voltage output from the amplifier is fed back to the amplifier input through the regulating bridge and tuned circuit with the phases arranged so that the circuit oscillates at the resonant frequency of the tuned circuit. The tuned circuit is series resonant and acts as a filter network. As the voltage output from the amplifier builds up, the resistance of the resistance element which changes resistance in accordance with the amount of current therethrough increases to a point wherein the bridge is brought near balance. A small bridge unbalance is required to supply a signal to the input of the amplifier to maintain oscillations.

The above-described circuit may become unstable whereupon the output from the amplifier is modulated at a slow rate. Stability is attained by keeping the bandwidth of the filter network in the feedback circuit narrow to attenuate the high frequency response of the bridge network. Stability is maintained, however, only at low frequencies in the range of from, say, 50 to 2400 cycles per second. At higher frequencies the instability is again experienced.

In order to maintain stability at even high operating frequencies, it is necessary that part of the input to the amplifier (which input is necessary for the maintenance of oscillations) be made substantially independent of the amplifier output. In accordance with my invention, the amplifier input comprises the bridge output plus a reference voltage derived from the amplifier output but made substantially independent thereof by the use of a non-linear resistance element, or elements. With my novel arrangement, the regulating loop is made stable, even at high frequencies, thereby avoiding amplitude modulation of the amplified signal commonly encountered in prior art regulating arrangements of this general type.

An object of this invention is the provision of an A.-C. voltage regulation circuit for use in power supplies to maintain a stable output from the said power supply.

An object of this invention is the provision of a precision variable frequency power supply which incorporates an amplifier with a feedback loop, the said feedback loop including a bridge circuit having a current-dependent resistance element in at least one arm thereof, a series resonant circuit in series with the bridge circuit in the feedback loop, and means deriving a substantially constant amplitude reference voltage from the amplifier output which reference voltage is fed back to the input of the amplifier to maintain oscillation of the system.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the appended claims.

In the drawings wherein like reference characters denote like parts in the several views:

FIGURE 1 is a schematic circuit diagram of a precision variable frequency power supply incorporating my invention;

FIGURE 2 is a current-voltage characteristic curve of a ballast resistor, or the like, suitable for use in the circuit of FIGURE 1;

FIGURE 3 is a current-voltage characteristic curve of a "Thyrite" element, or the like, suitable for use in the circuit of FIGURE 1;

FIGURE 4 is a schematic diagram of a pair of Zener diode elements connected in series opposition, which diodes may be used in place of the "Thyrite" element shown in FIGURE 1; and FIGURE 5 is a schematic diagram of a pair of potential biased diode elements which may be used in place of the "Thyrite" element shown in FIGURE 1.

Reference is first made to FIGURE 1 of the drawings wherein there is shown a precision power supply comprising an alternating current amplifier 10, a regulating bridge 11 and a filter network comprising one of the capacitors 12a–12d and one of the inductors 13a–13b connected in series circuit through a switch 14 and forming an oscillator. The switch 14 includes two decks having mechanically interconnected movable arms 16 and 17, and in the illustrated switch position, the capacitor 12a and inductor 13a are connected together and are tuned to oscillate at 50 cycles per second, for example. In other switch positions the capacitors and inductors are connected in various combinations to resonate at other frequencies which, by way of example, in the illustrated circuit may be 60, 400 and 50,000 cycles per second. Coupling elements comprising a shunt load resistor 18 and capacitor 19 connect the output from the filter to the input terminals 21 and 22 of the amplifier 10. The amplifier output terminals 23 and 24 are connected to the output terminals 26 and 27 of the system, across which terminals the instrument 28 under calibration is adapted to be connected.

The amplifier output terminals 23 and 24 are connected through lead wires 31 and 32 across the primary winding 33 of a transformer 34, which transformer includes first and second secondary windings 36 and 37, respectively. The secondary winding 36 supplies an input to the regulating bridge 11; the winding terminals being connected across the diagonally opposite terminals C and D of the bridge. The bridge network comprises a plurality of resistance elements 41, 42, 43 and 44 connected together in series circuit to form a Wheatstone bridge circuit. The resistance elements 41 and 42 are of the type displaying a constant resistance, the resistance element 43 is of the manually variable type, and the resistance element 44 is of the type having a resistance which varies in accordance with the amount of current therethrough. Heretofore, electric lamps, thermistors and ballast tubes, or resistances, have been used as the current-dependent resistor in similar applications, and may be used in the circuit of this invention. Many electric lamps are unsatisfactory since their resistance is sensitive to mechanical vibrations and to slow electrical drift. Thermistors change resistance with ambient temperature variations and, therefore, require temperature compensation or must operate in controlled ovens for use in precision regulator circuits. I have found that the ballast resistance, or tube, provides a satisfactory stable element for precision regulations. This element is commercially available and comprises a fine iron wire mounted in a glass bulb filled with hydrogen gas. The sensitivity of a bridge incorporating the ballast element may be made high, with a 10% change of bridge voltage input providing 5% of the bridge voltage output. A typical current-voltage characteristic curve of a ballast resistor, or the like, which is suitable for use in the bridge network 11 shown in FIGURE 2. It will be understood that the ballast resistor is operated at about the point X on the curve in the non-linear region thereof.

One output terminal E of the bridge is connected to the capacitors 12a–12d of the filter network while the diagonally opposite output terminal F is connected to the movable arm 46 of a potentiometer 47. The potentiometer 47 is connected in series with a resistor 48 across the secondary winding 37 of the transformer 34, and a reference volage $e_r$ is developed between the movable arm 46 and the one end of the potentiometer connected to the common ground 49. The reference potential is maintained substantially constant by use of a non-linear resistance element 51 connected across the potentiometer at points designated A and B. For stable operation of the circuit, the reference voltage must be made substantially independent of the amplifier output; complete independence thereof being desired but not necessary for proper operation. The non-linear resistance element 51 limits, or clips, the voltage developed across the potentiometer to thereby maintain such voltage substantially constant in face of voltage changes at the secondary winding 37 due to changes in the amplifier output.

The non-linear resistance 51 may comprise, for example, a "Thyrite" element. A typical current-voltage characteristic curve of a "Thyrite" element, or the like, which is suitable for use in the reference voltage circuit, is shown in FIGURE 3. It will be noted that above a predetermined level of current flow through the "Thyrite" element, the element develops a very low differential resistance, and a voltage drop that is substantially constant regardless of current therethrough.

A portion of the substantially constant A.-C. potential developed across the "Thyrite" element 51 (depending upon the setting of the potentiometer arm 46) is fed in series circuit with the output from the bridge 11 to the input of the amplifier 10 through the filter network. In a typical system, an amplifier input of approximately one volt is sufficient to maintain the system in oscillation and to provide a nominal amplifier output of, say 115 volts. With 115 volts at the transformer primary winding 33, a 30 volt signal is developed across the transformer secondary winding 36. The bridge 11 is brought to balance with the 30 volt signal applied thereto whereby no bridge output is developed across the bridge terminals E–F. The input to the amplifier, under balanced bridge conditions, comprises only the reference potential $e_r$ connected thereto through said bridge and filter network.

If, for any reason, the amplifier output changes (due to changes in the load thereon, or changes in the power input, designated B+, for example) the voltage across the bridge will change accordingly. Thus, if the voltage increases, the bridge supplies an output which is fed to the amplifier input in opposition to the reference voltage in series therewith and, conversely, if the voltage output from the amplifier decreases, the bridge output aids the reference voltage to increase the amplifier input signal. The reference voltage remains substantially constant in the face of amplifier output voltage changes, however, by reason of the element 51, as described above. This circuit is stable for any value of inductance in the filter whereby the circuit is operable to provide a precision output voltage at high frequencies. In addition to controlling the frequency of operation of the system, the filter removes, or attenuates, harmonic signals generated by the limiter action of the non-linear resistance 51. The filter also attenuates harmonic signals generated in the bridge network. The magnitude of the amplifier output voltage is set by adjustment of the reference voltage potentiometer 47 while maintaining the bridge in balance with the bridge resistor 43.

Having now described my invention in detail, in accordance with the requirements of the patent statutes, various changes and modifications will suggest themselves to those skilled in this art. For example, the non-linear resistance element 51 may be replaced with other elements exhibiting substantially the same characteristics for regulation of the reference voltage. In FIGURE 4, there is shown a pair of Zener diode elements 52 and 53 connected in series opposition which may be connected across the points A–B in place of the element 51. The series connected Zener diode elements provide a volt-ampere characteristic suitable for use in the development of a substantially constant magnitude reference voltage. In FIGURE 5, a pair of potential biased diode elements 56 and 57 are shown connected in parallel but in opposite sense and each element being subjected to an initial potential bias, in the non-conducting direction, by voltage sources 58 and 59, respectively. The elements 56 and 57 will pass current only when the voltage between points A and B exceeds the bias level of either of the parallel diode branches. Such combination may be substituted for the "Thyrite" element 51 connected between points A and B to provide the necessary stabilizing effect on the reference voltage. It is intended that these and other such changes and modifications shall fall within the spirit and scope of the invention as recited in the following claims.

I claim:

1. A stabilized A.C. power supply comprising,
 (a) an A.C. amplifier,
 (b) a resistance bridge having a current-dependent resistance element forming one arm thereof,
 (c) a transformer having a primary winding connected to the output circuit of the amplifier, a first secondary winding connected to the input terminals of said bridge, and a second secondary winding,
 (d) an inductance-capacitance network connected between one output terminal of said bridge and one input terminal of the amplifier,
 (e) means energized by the voltage developed in the said second secondary winding and providing an A.C. reference voltage of predetermined substantially constant magnitude, and
 (f) circuit elements applying the said reference voltage between the other output terminal of the bridge and the other input terminal of the amplifier.

2. The invention as recited in claim 1, wherein the means providing the A.C. reference voltage comprises a potentiometer connected across the second secondary winding, and a non-linear resistance element connected across the potentiometer.

3. The invention as recited in claim 2, wherein another bridge arm is a variable resistor, wherein the inductance-capacitance network comprises a plurality of inductors and capacitors, and including switch means operable to connect a selected inductor and capacitor in series between the said one output terminal of the bridge and the said one input terminal of the amplifier.

References Cited in the file of this patent

UNITED STATES PATENTS

| | | |
|---|---|---|
| 2,066,333 | Caruthers | Jan. 5, 1937 |
| 2,280,293 | Kreer | Apr. 21, 1942 |
| 2,288,486 | Rivlin | June 30, 1942 |
| 2,861,239 | Gilbert | Nov. 18, 1958 |
| 2,923,893 | Runyan | Feb. 2, 1960 |
| 2,930,992 | Rawlins et al. | Mar. 29, 1960 |
| 2,947,915 | Patchell | Aug. 2, 1960 |

FOREIGN PATENTS

| | | |
|---|---|---|
| 419,449 | Italy | Mar. 26, 1947 |